United States Patent [19]

Plach et al.

[11] Patent Number: 5,139,698

[45] Date of Patent: Aug. 18, 1992

[54] LIQUID CRYSTAL MEDIUM HAVING A LOW TEMPERATURE-DEPENDENCE OF THE D/P WINDOW

[75] Inventors: Herbert Plach, Darmstadt; Volker Reiffenrath, Rossdorf; Ralf Hochgesand, Karlsruhe, all of Fed. Rep. of Germany

[73] Assignee: Merck Patent Gesellschaft MIT Beschrankter Haftung, Darmstadt, Fed. Rep. of Germany

[21] Appl. No.: 552,656

[22] Filed: Jul. 16, 1990

[30] Foreign Application Priority Data

Jul. 17, 1989 [DE] Fed. Rep. of Germany ....... 3923560

[51] Int. Cl.$^5$ ..................... C09K 19/52; C09K 19/54
[52] U.S. Cl. ................. 252/299.01; 252/299.5
[58] Field of Search .............. 252/299.1, 299.2, 299.6, 252/299.61, 299.62, 299.63, 299.64, 299.65, 299.66, 299.67; 359/102, 103, 106

[56] References Cited

U.S. PATENT DOCUMENTS 4,744,918  5/1988  Heppke et al. .................. 252/299.61
4,779,960 10/1988  Kozaki et al. ................... 350/346
4,780,240 10/1988  Emato et al. ..................... 252/299.6

FOREIGN PATENT DOCUMENTS

3523185A1  1/1986  Fed. Rep. of Germany.

OTHER PUBLICATIONS

Finkenzeller et al., "Performance of Chiral Dopants in Nematic Mixtures", Mol. Cryst. Liq. Cryst. Letters, vol. 6(3); pp. 87-93.

*Primary Examiner*—Robert L. Stoll
*Assistant Examiner*—Shean C. Wu
*Attorney, Agent, or Firm*—Millen, White & Zelano

[57] ABSTRACT

The invention relates to a nematic liquid crystal medium of positive dielectric anisotropy containing one or more achiral liquid crystal compounds and a doping component, the doping component contains one or more doping substance which are chosen such that the medium, when used in a test cell suitable for determination of $\Delta(d/p)(T)$, has a low temperature dependence of the d/p window $d[\Delta(d/p)]/dT$.

15 Claims, 2 Drawing Sheets

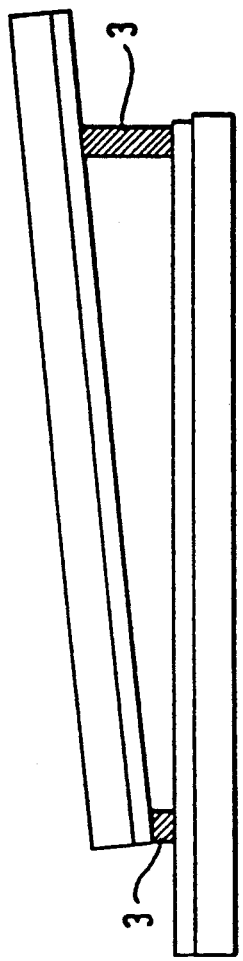
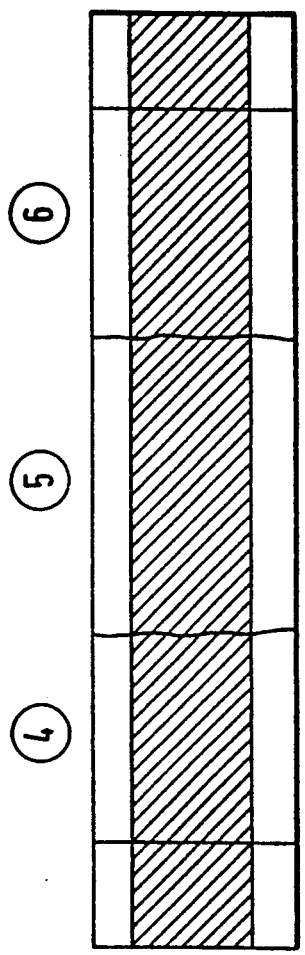
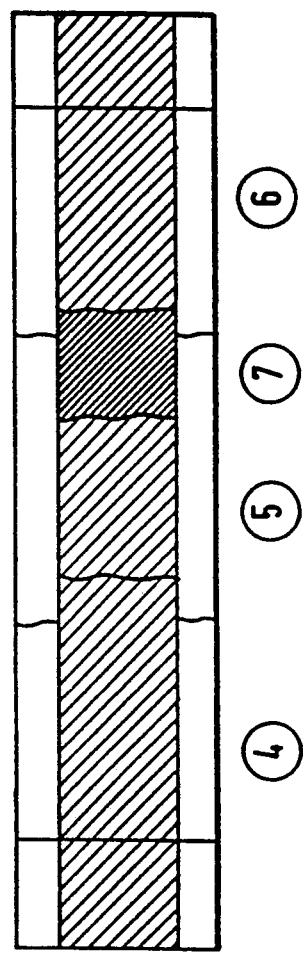

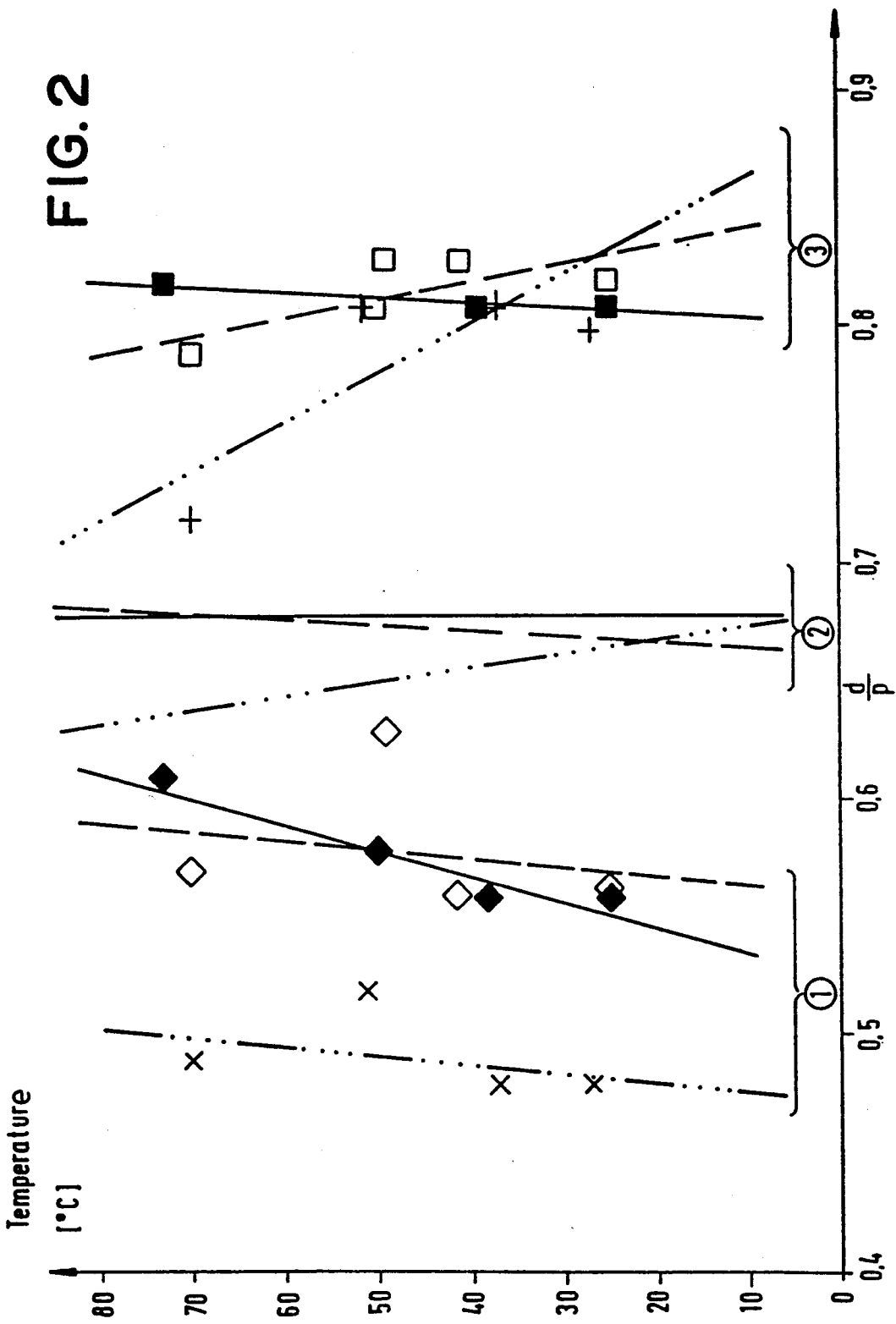

LIQUID CRYSTAL MEDIUM HAVING A LOW TEMPERATURE-DEPENDENCE OF THE D/P WINDOW

Summary of the Invention

The invention relates to a nematic liquid crystal meadium of positive dielectric anisotropy containing one or more achiral liquid crystal compounds and a doping component.

The addition of a doping component forces the nematic structure of the medium to adopt a macroscopic twist which is characterized by the pitch p, that is to say the distance along which the helical axis is rotated by $2\pi$. The following equation applies (when a doping substance is used):

$$p = \frac{1}{HTP \times c} \quad (1)$$

wherein HTP (helical twisting power) is the rotary power and c is the concentration of the doping substance (that is to say of the chiral compound added). The concentration is usually stated in percent by weight, so that the HTP has the dimension of a reciprocal length.

Nematic liquid crystal media having a high pitch, that is to say a low HTP and low concentration c of the doping component, are used, for example, in standard TN liquid crystal displays having a twist angle of $\phi \approx \pi/4$ for suppression of "reversed twist" defects Other important uses for liquid crystal media containing a doping component are, for example, phase change liquid crystal displays, and liquid crystal displays used as temperature sensors, the intention of this list being only to illustrate the invention and not to limit it.

The quotient of cell thickness and pitch d/p is a parameter which is of importance in particular for the design of STN liquid crystal displays.

Thus, if the d/p chosen is too high, disturbances are observed in STN liquid crystal displays when a voltage is applied, these disturbances having the appearance under the microscope of more or less parallel stripes and therefore being called "striped domains".

On the other hand, if the quotient d/p is too low, the twist angle becomes less than desired by a factor of $\pi$ ("$\pi$-domain"). To obtain a domain-free display, the quotient d/p must lie within a defined interval $\Delta d/p$, the so-called d/p window, for a certain STN liquid crystal display and a certain nematic liquid crystal medium.

The pitch, the cell spacing d and therefore the quotient d/p, like the d/p window $\Delta d/p$, is temperature-dependent. The working temperature range in which the liquid crystal display can be operated without domains is limited by the fact that the condition in the equation $$(d/p)_{min}(T) < d/p(T) < (d/p)_{max}(T)$$

must always be met.

To extend the working temperature range, it has been proposed to substantially compensate for the temperature-dependence of the pitch p of the liquid crystal medium by using 2 doping substances having a different temperature-dependence of p (for example U.S. Pat. No. 4,780,240; and F. Moia, New Liquid Crystal Mixtures for Supertwisted LCDs with Low Tendency for Fingerprint Textures, Freiburger Arbeitstagung "Liquid Crystals" 1989).

However, this solution does not take into account that not only d/p but also the d/p window $\Delta d/p$ is temperature-dependent. The proposal thus does not represent generally applicable instructions on how to extend the working temperature range. In particular, it must fail if the d/p window $\Delta d/p$ is low and/or decreases markedly as the temperature increases, or the pitch has a significantly lower temperature-dependence dp/dT than the d/p window $$\frac{d}{dT}\left(\Delta\frac{d}{p}\right)$$

and/or the minimum or maximum d/p value $$\frac{d}{dT}(d/p)_{min} \quad \text{or} \quad \frac{d}{dT}(d/p)_{max}.$$

Because of the great importance of liquid crystal media containing a doping component, in particular also for STN liquid crystal displays, there was therefore a great need to find nematic liquid crystal media which are characterized by a wide working temperature range and do not have the abovementioned disadvantages.

The invention is therefore based on the object of providing nematic liquid crystal media of positive-dielectric anisotropy containing one or more achiral liquid crystal compounds and a doping component, in which the widest possible working temperature range is achieved, taking into consideration the temperature dependence of the d/p window $\Delta d/p$.

Upon further study of the specification and appended claims, further objects and advantages of this invention will become apparent to those skilled in the art.

Surprisingly, it has now been found that these objects can be achieved by providing the nematic liquid crystal media according to the invention.

The invention thus relates to a nematic liquid crystal medium of positive dielectric anisotropy containing one or more achiral liquid crystal compounds and a doping component, one or more doping substances being chosen for the doping component such that the medium, when used in a test cell suitable for determination of the d/p window $$\Delta\frac{d}{p}(T),$$

shows a low temperature dependence of the d/p window $d[\Delta(d/p)]/dT$. The average temperature dependence $\Delta[\Delta(d/p)]\Delta T$ in the temperature range between 20° and 60° C. is preferably less than $5 \times 10^{-2} K^{-1}$.

The temperature of the coalescence point $T_K$, at which the d/p window disappears, is preferably greater than 60° C. and in particular lies above the clearing point $T_c$ of the liquid crystal medium.

The temperature dependence of the helical twisting power HTP and the concentration of the doping substances are preferably chosen such that the temperature dependence of the d/p value of the medium is matched to the temperature dependence of the d/p window to the optimum.

The temperature at which the d/p value of the medium is less than $(d/p)_{min}$ or greater than $(d/p)_{max}$ is preferably greater than 60° C.

Liquid crystal media in which the d/p value at the coalescence temperature $T_K$ differs from the d/p value of the coalescence point by not more than +0.1 or −0.1 and in which the d/p value at room temperature lies within the d/p window at this remperature are preferred.

A chiral doping substance having an average temperature dependence of the helical twisting power $\Delta HTP/\Delta T$ which is less than $5 \times 10^{-1} \mu m^{-1} K^{-1}$ in the temperature range between 20° C. and 60° C. is used in particular as the doping component.

The use of 2 chiral doping substances is preferred.

The doping component preferably contains at least one chiral doping substance of the formula I, $$R^1—CO—O—CHR^0—CH_2—O—OC—R^2 \qquad I$$

wherein

R$^1$ and R$^2$ independently of one another are each a group

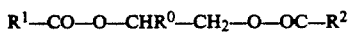

in which

A$^1$ and A$^2$ in each case independently of one another are a 1,4-phenylene, pyrimidine-2,5-diyl, 1,4-cyclohexylene, 1,3-dioxane-2,5-diyl, 1,4-dithiane-2,5-diyl or 1,4-bicyclo(2.2.2)-octylene group, it also being possible for this group to be substituted by one or more substituents from the group comprising F, Cl, Br, CN and/or alkyl groups having up to 12 C atoms, and it being possible for 1 or 2 CH$_2$ groups in the alkyl groups to be replaced by O atoms, Z is —CO—O—, —O—CO—, —CH$_2$CH$_2$—, —OCH$_2$—, —CH$_2$O—, —CH=N—, —N=CH—, —N=N—, —N(O)=N— or a single bond, m and n in each case independently of one another are 0, 1 or 2 and Y is a straight-chain or branched alkyl group having up to 12 C atoms, it being possible for 1 or 2 CH$_2$ groups to be replaced by 0 atoms, or if n is 1 or 2, also F, Cl, Br or CN, and R$^0$ is an alkyl group having 1–5 C atoms, unsubstituted or substituted (C$_6$–C$_{18}$)-aryl or (C$_5$–C$_{12}$)cycloalkyl.

In the above-described alkyl groups, when 2 CH$_2$ groups are each replaced by 0 atoms, the 2 replaced CH$_2$ groups are non-adjacent, i.e., separated from each other by at least one CH$_2$ group.

The doping component furthermore preferably contains at least one chiral doping substance having 2 chirality centers.

The liquid crystal media according to the invention preferably contain 2-60 achiral liquid crystal compounds. In particular, these media contain 10-60% of achiral liquid compounds chosen from the classes comprising azoxybenzenes, benzylideneanilines, biphenyls, terphenyls, phenyl or cyclohexyl benzoates, phenyl or cyclohexyl cyclohexanecarboxylates, phenyl or cyclohexyl esters of cyclohexylbenzoic acid, phenyl or cyclohexyl esters of cyclohexylcyclohexanecarboxylic acid, cyclohexylphenyl esters of benzoic acid, cyclohexanecarboxylic acid or cyclohexylcyclohexanecarboxylic acid, phenylcyclohexanes, cyclohexylbiphenyls, phenylcyclohexylcyclohexanes, cyclohexylcyclohexanes, cyclohexylcylcohexenes, cyclohexylcyclohexylcyclohexenes, 1,4-biscyclohexylbenzenes, 4,4'-bis-cyclohexylbiphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)-ethanes, 1-cyclohexyl-2-biphenylylethanes,1-phenyl-2-cyclohexylphenylethanes, 1-cyclohexylcyclohexyl-2-phenylethanes, halogenated stilbenes, benzylphenyl ethers, tolans and substituted cinnamic acids.

The invention furthermore relates to STN liquid crystal displays containing liquid crystal media according to the invention and to the use of the liquid crystal media according to the invention in STN liquid crystal displays.

The temperature dependence of the d/p window is preferably determined in a test cell suitable for this purpose. The use of a wedge-shaped electrode arrangement produced by a spacer (wedge cell), which is shown in FIG. 1, is preferred. This cell is filled with a liquid crystal medium which contains a doping component and has a certain pitch p. If the HTP of the doping component is not known, it can be determined by the method described in Mol. Cryst. Liq. Cryst. Letters, 6 (1988) 87. In the wedge cell, the desired twist angle $\phi$ is established in the range ⑤ (see FIG. 26).

In the region ⑦, when a voltage is applied, striped domains are first formed, before the twist angle $\phi + \pi$ is established in the region ⑥. The $\phi - \pi$ domain is observed in the region ④.

The d/p window can be measured directly with this wedge cell arrangement. If the arrangement is supplemented by heating, which can be effected, for example, by radiant heat, and a temperature sensor, for example a thermocouple, the temperature dependence of the d/p window $$\frac{d}{dT}\left(\Delta \frac{d}{p}\right)$$

can be measured.

However, it is also possible to use open flat cells with electrodes arranged in parallel, the cell spacing d of which can be varied in a defined manner in the 0.01 $\mu m$ range and/or which can be filled with liquid crystal media of different pitch length at a fixed d.

Closed flat cells (displays) can furthermore also be used. It is possible to use, for example, a set of cells filled with the same liquid crystal medium, but in which the cell spacing d changes from cell to cell by a small amount $\Delta d$, which in particular is, for example, $\Delta d = 0.02$ $\mu m$ close to $(d/p)_{max}$ or $(d/p)_{min}$. For practicability reasons, however, the use of a wedge cell or an open flat cell is in general preferred. For this reason the term test cell will therefore only be used for the wedge cell or the open flat cell.

In general, $$\frac{d}{dT}\left(\Delta \frac{d}{p}\right) \text{ is } < 0,$$

that is to say the d/p window becomes narrower as the temperature rises. The point at which the d/p window disappears is called the coalescence point at the temperature $T_K$.

The liquid crystal media according to the invention contain one or more doping substances which are chosen such that the temperature dependence of the d/p window measured in a test cell is as low as possible. Those media for which $$\frac{\Delta\left(\Delta\frac{d}{p}\right)}{\Delta T}$$

is less than $5 \times 10^{-2}$ K$^{-1}$, but in particular less than $2 \times 10^{-2}$ K$^{-1}$ and especially preferably less than $1 \times 10^{-2}$ K$^{-1}$, in the temperature range between 20° C. and 60° C. are preferred.

The temperature of the coalescence point $T_K$ is preferably greater than 60° C., in particular >70° C. and especially >80° C. $T_K$ is furthermore preferably greater than the clearing point $T_C$ of the liquid crystal medium, so that a d/p window exists in the entire liquid crystal phase range.

The d/p value of the liquid crystal media according to the invention and the temperature dependence of this value, which is given by the temperature dependence of the pitch p, must be adjusted in as optimum a manner as possible to match the temperature dependence of the d/p window $$\frac{d}{dT}\left(\frac{d}{p}\right)$$

and that of the upper and lower limit $$\frac{d}{dT}\left(\frac{d}{p}\right)_{max} \text{ and } \frac{d}{dT}\left(\frac{d}{p}\right)_{min}.$$

An adjustment in which the d/p value of the medium differs from $(d/p)_{max}$ and $(d/p)_{min}$ as much as possible in the entire existing range of the d/p window is preferred. Another preferred adjustment is that where the d/p value of the liquid crystal medium at room temperature lies within the d/p window at this temperature and, at the temperature of the coalescence point $T_K$, deviates from the d/p value of the coalescence point as little as possible. Liquid crystal media in which teh deviation $$\delta = (d/p)_{M,TK} - (d/p)_{KP}$$

lies between $-0.1$ and $+0.1$ are preferred (M=medium, KP=coalescence point). Deviations $\delta$ for which $\delta < |0.05|$, and especially those where $\delta < |0.03|$ are particularly preferred. The temperature at which the d/p value of the medium is less than $(d/p)_{min}$ or greater than $(d/p)_{max}$ is preferably greater than 60° C., but in particular greater than 80° C.

The doping component can contain one or more chiral doping substances. If it contains only one doping substance, the temperature dependence of the pitch of the medium is given, in accordance with (1), by the temperature dependence of the HTP of the doping substance in the medium. Those doping substances which have an average temperature dependence of the HTP in the temperature range between 20° C. and 6020 C.

$$\frac{\Delta HTP}{\Delta T} < 5 \times 10^{-1} \, \mu m^{-1} \, K^{-1}$$

but in particular $<2 \times 10^{-1}$ $\mu m^{-1}$ K$^{-1}$ and especially $<1 \times 10^{-2}$ $\mu m^{-1}$ K$^{-1}$ are preferred.

When applying the measured values obtained for $\Delta d/p$, $(d/p)_{max}$, $(d/p)_{min}$ and/or $$\frac{d}{dT}(\Delta d/p)$$

obtained in wedge cells and/or open flat cells to closed flat cells (displays), it must be remended that the cell spacing in closed flat cells is temperature-dependent, $d = d(T)$, and increases, for example, in the order of $$\frac{\Delta d}{d_o} = 0.015$$

at a temperature increase of about 20° C.

Those dopsing substances for which $$\epsilon = \left| \frac{d\left(\frac{d(T)}{d_o}\right)}{dT} + \frac{d\left(\frac{HTP(T)}{HTP_o}\right)}{dT} \right|$$

is less than 0.01 K$^{-1}$, but in particular $\epsilon$ is less than $5 \times 10^{-3}$ K$^{-1}$ and especially $\epsilon$ is less than $1 \times 10^{-3}$ K$^{-1}$, are particularly preferred for closed flat cells.

If more than one, for example 2, chiral components are used, the reciprocal value of the overall pitch established is often given by a linear combination of the contributions of the individual components, for example $$\frac{1}{p} = HTP_1 C_1 + HTP_2 C_2 \qquad (2)$$

where the index characterizes the two different components. The temperature dependence of p is determined by the temperature dependence of the HTP of the two doping substances and can be matched to the temperature dependence of the d/p window by varying the doping substances and their concentration.

Chiral doping substances of the formula I $$R^1-CO-O-CHR^0-CH_2-O-OC-R^2 \qquad I$$

where $R^1$, $R^2$, $A^1$, $A^2$, Z, m, n, Y and $R^0$ have the above-mentioned meaning are preferred. Particularly preferred compounds of the formula I and processes for their preparation are described in DE 35 23 185.

The chiral doping substances can contain one or more chirally centers. Those doping components in which at least one chiral doping substance contains two chirality centers are preferred. Those chiral components which contain the structural element II

in which

S in each case independently of one another is an alkyl or alkoxy group having 1–5 C atoms, CN or halogen, T in each case independently of one another is —O—, —COO—, —OOC—, —CH₂CH₂— or a single bond, and

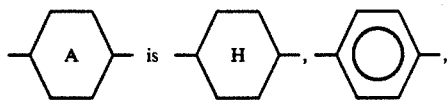

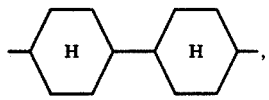

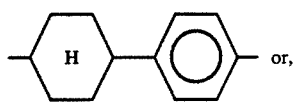

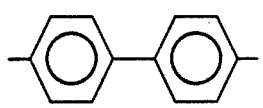

are especially preferred.

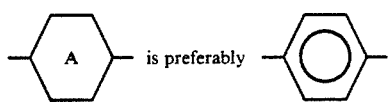

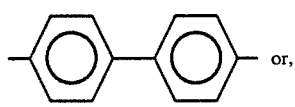

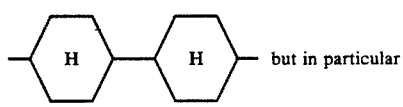

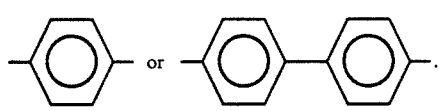

S is preferably CH₃—, CH₃—CH₂—, Cl or CN, and especially preferably CH₃—, Cl or CN.

The nematic liquid crystal media according to the ginvention preferably contain 2–10, in particular 4–30 and especially preferably 7–25 achiral liquid crystal compounds. These other constituents are preferably selected from the nematic or nematic (monotropic) or isotropic compounds, compounds selected from the compound classes listed above being preferred. The 1,4-phenylene groups in these compounds can also be fluorinated.

The most important compounds suitable as further constituents of media according to the invention can be characterized by the formulae 1, 2, 3, 4 and 5:

R'—L—E—R''  (1)

R'—L—COO—E—R''  (2)

R'—L—OOC—E—R''  (3)

R'—L—CH₂CH₂—E—R''  (4)

R'—L—C≡C—E—R''  (5)

In the formulae 1, 2, 3, 4 and 5, L and E, which can be identical or different, in each case independently of one another, are a divalent radical from the group comprising -Phe-, -Cyc-, -Phe-Phe-, -Phe-Cyc-, -Cyc-Cyc-, -Pyr-, -Dio-, -G-Phe- and -G-Cyc- and mirror images thereof, in which Phe is unsubstituted or fluorine-substituted 1,4-phenylene, Cyc is trans-1,4-cyclohexylene or 1,4-cyclohexylene, Pyr is pyrimidine-2,5-diyl or pyridine-2,5-diyl, Dio is 1,3-dioxane-2,5-diyl and G is 2-(trans-1,4-cyclohexyl)-ethyl, pyrimidine-2,5-diyl, pyridine-2,5-diyl or 1,3-dioxane-2,5-diyl.

Preferably, one of the radicals L and E is Cyc, Phe or Pyr. E is preferably Cyc, Phe or Phe-Cyc. The media according to the invention preferably contain one or more components selected from the compounds of the formulae 1, 2, 3, 4 and 5, in which L and E are selected from the group comprising Cyc, Phe and Pyr, and at the same time one or more components selected from the compounds of the formulae 1, 2, 3, 4 and 5, in which one of the radicals L and E is selected from the group comprising Cyc, Phe and Pyr and the other radical is selected from the group comprising -Phe-Phe-, -Phe-Cyc-, -Cyc-Cyc-, -G-Phe- and -G-Cyc- and if appropriate one or more components selected from the compounds of the formulae 1, 2, 3, 4 and 5, in which the radicals L and E are selected from the group comprising -Phe-Cyc-, -Cyc-Cyc-, -G-Phe- and -G-Cyc-.

In a preferred sub-group of compounds of the formulae 1, 2, 3, 4 and 5, R' and R'' in each case independently of one another are alkyl, alkenyl, alkoxy, alkenyloxy or alkanoyloxy having up to 8 carbon atoms (group 1). In most of these compounds, R' and R'' are different from one another, one of these radicals usually being alkyl or alkenyl. In another preferred sub-group of compounds of the formulae 1, 2, 3, 4 and 5, R'' is —CN, —CF₃, —OCF₃, F, Cl or —NCS; R has the meaning given for the compounds of group 1 and is preferably alkyl or alkenyl (group 2). However, other variants of the intented substituents in the compounds of the formulae 1, 2, 3, 4 and 5 can be used. Many such substances or mixtures thereof are commercially available. All these substances can be obtained by methods which are known from the literature or by methods analogous thereto.

The media according to the invention preferably also contain components of group 2 in addition to components of group 1, their contents preferably being as follows:

Group 1: 20 to 90%, in particular 30 to 90%,
Group 2: 10 to 80%, in particular 10 to 50%.

The liquid crystal mixtures according to the invention are preferably used in STN liquid crystal displays which have a twist angle $\phi \geq \pi/2$. In comparison with standard TN liquid crystal displays where $\phi \approx \pi/4$, such STN liquid displays are distinguished by a considerably better steepness of the electrooptical characteristic line and, associated with this, by better contrast values as well as by a considerably lower dependence of the contrast on the viewing angle. STN liquid crystal displays are described, for example, in EP 0,131,216 B1; DE 34 23 993 A1; EP 0,098,070 A2; M. Schadt and F. Leenhouts, 17th Freibourg Conference on Liquid Crystals (08.-10.04.87); K. Kawasaki et al., SID 87 Digest 391

(20.06); M. Schadt and F. Leenhouts, SID 87 Digest 372 (20.01); K. Katoh et al., Japanese Journal of Applied Physics, Vol. 26, No. 11, L 1784-L 1786 (1987); F. Leenhouts et al., Appl. Phys. Lett. 50 (21), 1468 (1987); H. A. van Sprang and H. G. Koopman, J. Appl. Phys. 62 (5), 1734 (1987); T.J. Scheffer and J. Nehring, Appl. Phys. Lett. 45 (10), 1021 (1984); M. Schadt and F. Leenhouts, Appl. Phys. Lett. 50 (5), 236 (1987); E. P. Raynes, Mol. Cryst. Liq. Cryst. Letters Vol. 4 (1), pages 1-8 (1986); C. M. Waters et al., Proc. Soc. Inf. Disp. (New York (1985) (3rd Intern. Display Conference, Kobe, Japan); DE-OS 35 03 259; T. J. Scheffer and J. Nehring, Appl. Phys. Lett. 45 (1984) 1021; M. Schadt and F. Leenhouts, Appl. Phys. Lett. 50 (1987) 236; EP-OS 0,246,842; K. Kawasaki et al., SID 87 Digest 391 (20.06.).

BRIEF DESCRIPTION OF THE DRAWINGS

Various other objects, features and attendant advantages of the present invention will be more fully appreciated as the same becomes better understood when considered in conjunction with the accompanying drawings in which like reference characters designate the same or similar parts throughout the several views, and wherein FIG. 1 illustrates a wedge cell for the determination of the d/p window, $\Delta d/p(T)$; and FIG. 2 shows the experimentally determined values for $(d/p)_{min}$, $(d/p)_{max}$ and $(d/p)_{opt}$ of the liquid crystal medium of example 1.

DETAILED DESCRIPTION

In FIG. 1, there is illustrated a side view of a wedge cell. The two substrates of the cell are separated by spacers ③. FIG. 1a illustrates a planar view of the wedge cell without the application of a voltage. The reference numerals ④, ⑤, and ⑥ illustrate, respectively, regions with twist angle $(\phi - \pi)$, twist angle $(\phi)$ and twist angle $(\phi + \pi)$. FIG. 1b is a planar view of the wedge cell with the application of a voltage. Reference numeral ⑦ illustrates formation of striped domains.

In FIG. 2, results for experiment 1.1 are shown graphically by the line, -·····-; results for experiment 1.2 are shown graphically by the line, ----; and results for experiment 1.3 are graphically illustrated by the line, ——. FIG. 2 ① shows $(d/p)_{min}$ as a function of temperature for the test results of experiment 1.1 (X) experiment 1.2 (◊) and experiment 1.3 (◆). FIG. 2 ② illustrates $(d/p)_{opt}$ as a function of temperature for experiments 1.1, 1.2 and 1.3. Similarly, FIG. 2 ③, illustrates $(d/p)_{max}$ as a function of temperature for experiment 1.1(+), experiment 1.2(□), and experiment 1.3 (■).

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding application Federal Republic of Germany P 39 23 560.2, filed Jul. 17, 1989, are hereby incorporated by reference.

EXAMPLES

Example 1

Chiral doping substances selected from the group comprising C1 and C2:

C1: (S)-4-((1-methyl-heptyl)-oxy-carbonyl)-phenyl 4-hexoxy-benzoate

C2: (S)-1,2-bis-(4-(trans-4-pentylcyclohexyl)-benzoyloxy)-1-phenylethane are added to a liquid crystal base mixture consisting of 5% of 4-(trans-4-ethylcyclohexyl)-benzonitrile
15% of 4-(trans-4-propylcyclohexyl)-benzonitrile
11% of 4-(trans-4-butylcyclohexyl)-benzonitrile
21% of 4-(trans-4-pentylcyclohexyl)-benzonitrile
11% of 4-(trans-4-heptylcyclohexyl)-benzonitrile
5% of 4-(trans-4-propylcyclohexyl)-ethylbenzene
12% of 4'-(trans-4-propylcyclohexyl)-4-ethyl-biphenyl
10% of 4'-(trans-4-pentylcyclohexyl)-4-ethyl-biphenyl
4% of 4'-(trans-4-propylcyzlohexyl)-4-(trans-4-propyl-cyclohexyl)-biphenyl

TABLE 1

| Experiment | Concentration of the doping substances [%] |
|---|---|
| 1.1 | 1% of (C1) |
| 1.2 | 0.305% of (C2) |
| 1.3 | 0.10% of (C1) + 0.28% of (C2) |

The temperature dependence of the d/p window was determined in a wedge cell as outlined in FIG. 1. The measured results are summarized in the following Tables 2-4. The optimum d/p value $(d/p)_{opt}$ relates to a cell which is filled with the particular doped medium and has a thickness of d=6.5 μm.

TABLE 2

| | Results of Experiment 1.1 | | | | |
|---|---|---|---|---|---|
| | T [°C.] | | | | |
| | 20 | 27 | 37 | 51 | 70 |
| $(d/p)_{min}$ | — | 0.48 | 0.48 | 0.52 | 0.49 |
| $(d/p)_{max}$ | — | 0.80 | 0.81 | 0.81 | 0.72 |
| $\Delta d/p$ | — | 0.32 | 0.33 | 0.29 | 0.23 |
| $(d/p)_{opt}$ | 0.67 | — | 0.65 | 0.65 | 0.64 |

TABLE 3

| | Results of Experiment 1.2 | | | | |
|---|---|---|---|---|---|
| | T [°C.] | | | | |
| | 20 | 25 | 41 | 48 | 70 |
| $(d/p)_{min}$ | — | 0.56 | 0.56 | 0.63 | 0.57 |
| $(d/p)_{max}$ | — | 0.82 | 0.83 | 0.83 | 0.79 |
| $\Delta d/p$ | — | 0.26 | 0.27 | 0.20 | 0.22 |
| $(d/p)_{opt}$ | 0.67 | — | 0.68 | 0.68 | 0.66 |

TABLE 4

| | Results of Experiment 1.3 | | | |
|---|---|---|---|---|
| | T [°C.] | | | |
| | 25 | 39 | 50 | 73 |
| $(d/p)_{min}$ | 0.56 | 0.56 | 0.58 | 0.61 |
| $(d/p)_{max}$ | 0.81 | 0.81 | 0.81 | 0.82 |
| $\Delta d/p$ | 0.25 | 0.25 | 0.23 | 0.21 |
| $(d/p)_{opt}$ | 0.68 | 0.68 | 0.68 | 0.68 |

The measured results are shown graphically in FIG. 2. The extrapolated coalescence points of the particular mixtures are summarized in Table 5:

TABLE 5

| Experiment | Coalescence points Temperature of the coalescence point $T_K$ (°C.) |
| --- | --- |
| 1.1 | 170 |
| 1.2 | 260 |
| 1.3 | 310 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A neumatic liquid crystal medium of positive dielectric anisotropy for use in a STN cell comprising at least one achiral liquid crystal compound and a doping component consisting of one or more doping substances with the relation $$\left| \frac{d\left(\frac{d(T)}{d_0}\right)}{dT} + \frac{d\left(\frac{HTP(T)}{HTP_0}\right)}{dT} \right|$$

being less than $5 \times 10^{-3} \, K^{-1}$ wherein
HTP is the helical twisting power, and
d is the cell spacing for each of the doping substances,
the doping substances being chosen so that the medium, when used in a test cell for determination of $$\Delta \frac{d}{p} (T),$$

has an average temperature dependence of the d/p window, $$\Delta \left[ \Delta \left( \frac{d}{p} \right) \right] / \Delta T,$$

of less than about $5 \times 10^{-2} \, K^{-1}$ in the temperature range of about 20°–60° C.

2. A medium according to claim 1, wherein the temperature of the coalescence point, $T_K$, at which the d/p window disappears is greater than about 60° C.

3. A medium according to claim 1, wherein the temperature of the coalescence point, $T_K$, is above that of the clearing point, $T_C$, of the medium.

4. A medium according to claim 1, wherein the temperature dependence of the helical twisting power, HTP, and the concentration of the doping substance(s) are chosen such that the temperature dependence of the thickness, d value of the medium is optionally matched to the temperature dependence of the d/p window.

5. A medium according to claim 1, wherein the d/p value which the medium has at the coalescence temperature $T_K$ differs from the d/p value of the coalescence point by not more than about +0.1 or −0.1 and in that the d/p value of the medium at room temperature lies within the d/p window at room temperature.

6. A medium according to claim 1, wherein the temperature at which the d/p value of the medium is less than $(d/p)_{min}$ or greater than $(d/p)_{max}$ is greater than about 60° C.

7. A medium according to claim 1, wherein a chiral doping substance having an average temperature dependence of the helical twisting power, $\Delta HTP/\Delta T$, of less than about $5 \times 10^{-1} \, \mu m^{-1} \, K^{-1}$ in the temperature range of about 20° C.–60° C. is used as the doping component.

8. A medium according to claim 1, wherein the medium contains at least two chiral doping substances.

9. A medium according to claim 1, wherein at least one chiral doping substance is of the formula $$R^1-CO-O-CHR^0-CH_2-O-OC-R^2$$

wherein
$R^1$ and $R^2$ independently of one another are each a group $$-(A^1-Z)_m-(A^2)_n-Y$$

$A^1$ and $A^2$ in each case independently of one another are a 1,4-phenylene, pyrimidine-2,5-diyl, 1,4-cyclohexylene, 1,3-dioxane-2,5-diyl, 1,4-dithiane-2,5-diyl or 1,4-bicyclo(2.2.2)-octylene group, in each case being unsubstituted or substituted by one or more substituents from the group comprising F, Cl, Br, CN and/or alkyl groups having up to 12 C atoms, and it being possible for 1 or 2 $CH_2$ groups in the alkyl groups to be replaced by O atoms;
Z is $-CO-O-$, $-O-CO-$, $-CH_2CH_2-$, $-OCH_2-$, $-CH_2O-$, $-CH=N-$, $-N=CH-$, $-N=N-$, $-N(O)=N-$ or a single bond;
m and n in each case independently of one another are 0, 1 or 2;
Y is a straight-chain or branched alkyl group having up to 12 C atoms, it being possible for 1 or 2 $CH_2$ groups to be replaced by O atoms, or if n is 1 or 2, Y can also be F, Cl, Br, or CN; and
$R^0$ is an alkyl group having 1–5 C atoms, unsubstituted or substituted ($C_6$–$C_{18}$)-aryl, or substituted or unsubstituted ($C_5$–$C_{12}$)-cycloalkyl.

10. A medium according to claim 1, wherein at least one chiral doping substance contains 2 chirality centers.

11. A medium according to claim 1, wherein said medium contains 2–60 achiral liquid crystal compounds.

12. A medium according to claim 11, wherein said medium contains 10%–60% of achiral liquid crystal compounds selected from the group comprising: azoxybenzenes, benzylideneanilines, biphenyls, terphenyls, phenyl or cyclohexyl benzoates, phenyl or cyclohexyl cyclohexanecarboxylates, phenyl or cyclohexyl esters of cyclohexylbenzoic acid, phenyl or cyclohexyl esters of cyclohexylcyclohexanecarboxylic acid, cyclohexylphenyl esters of benzoic acid, cyclohexanecarboxylic acid or cyclohexylcyclohexanecarboxylic acid, phenylcyclohexanes, cyclohexylbiphenyls, phenylcyclohexylcyclohexanes, cyclohexylcyclohexanes, cyclohexylcyclohexenes, cyclohexylcyclohexylcyclohexenes, 1,4-bis-cyclohexylbenzenes, 4,4'-cyclohexylcyclohexenes, 1,4-bis-cyclohexylbenzenes, 4,4'-bis-cyclohexylbiphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)-ethanes, 1-phenyl-2-cyclohexylphenylethanes, 1-cyclohexylcyclohexyl-2-phenylethanes, halogenated stilbenes, benzyl phenyl ethers, tolans and substituted cinnamic acids.

13. A medium according to claim 1, wherein said doping component comprises at least one chiral doping substance which possesses a structural component in accordance with the following partial formula:

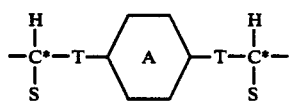

wherein

S in each case independently of one another is $C_{1-5}$-alkyl, $C_{1-5}$-alkoxy, CN or halogen;

T in each case independently of one another is

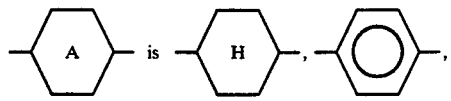

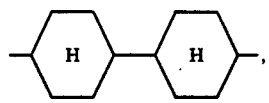

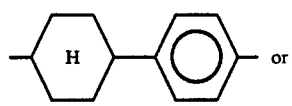

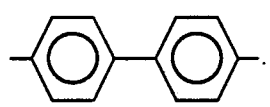

14. In a supertwist liquid crystal display cell, the improvement wherein said liquid crystal display cell contains a liquid crystal medium according to claim 1.

15. In a method of producing a visual display comprising applying a voltage to a liquid crystal display cell, the improvement wherein said cell is a liquid crystal display cell according to claim 14.

* * * * *